(12) United States Patent　　(10) Patent No.: US 7,431,213 B2
Garapati et al.　　(45) Date of Patent: Oct. 7, 2008

(54) BARCODE PRINTING SYSTEM

(75) Inventors: Srinivas Garapati, Rochester, NY (US);
Christopher R. Klapp, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 381 days.

(21) Appl. No.: 11/274,085

(22) Filed: Nov. 15, 2005

(65) Prior Publication Data

US 2007/0108277 A1　May 17, 2007

(51) Int. Cl.
*G06K 7/10*　(2006.01)
(52) U.S. Cl. .............................. 235/462.01; 235/462.09; 235/462.25
(58) Field of Classification Search ............ 235/462.01, 235/462.09, 462.25; 358/1.11
See application file for complete search history.

(56) References Cited

U.S. PATENT DOCUMENTS

| | | | |
|---|---|---|---|
| 1,985,035 A | 12/1934 | Kermode et al. | |
| 2,020,925 A | 11/1935 | Young | |
| 5,479,515 A * | 12/1995 | Longacre, Jr. | 380/54 |
| 5,493,634 A | 2/1996 | Bonk et al. | |
| 5,564,841 A * | 10/1996 | Austin et al. | 400/103 |
| 5,619,027 A | 4/1997 | Ackley | |
| 5,939,700 A * | 8/1999 | Ackley | 235/462.01 |
| 6,147,767 A * | 11/2000 | Petteruti et al. | 358/1.18 |
| 6,726,104 B2 * | 4/2004 | Schuessler et al. | 235/462.09 |
| 2005/0012949 A1 * | 1/2005 | Kitahara et al. | 358/1.11 |

* cited by examiner

*Primary Examiner*—Ahshik Kim
(74) *Attorney, Agent, or Firm*—Gary B. Cohen

(57) ABSTRACT

A printing system including an interpreter with an interpreter program is provided. The interpreter converts each one of multiple print jobs from a job language format to a printable format for consumption by a printer. At least one of the multiple print jobs includes an identifier indicating that the at least one of the multiple print jobs includes bar code printing related information. The printing system includes a barcode font call processing program and an interpreter support system. Each one of the multiple print jobs is read by the interpreter support system and, when the interpreter support system reads the at least one of the multiple print jobs, the at least one of the multiple print jobs is processed with the barcode font call processing program so that a barcode font call, for delivery by the interpreter support system to the interpreter, is generated by the barcode font call processing program.

20 Claims, 3 Drawing Sheets

BARCODE PRINTING SYSTEM

BACKGROUND AND SUMMARY

The disclosed embodiments relate to a system and method for processing a barcode font call. The system includes an interpreter support system communicating with a barcode font call-processing program. As disclosed, each job containing certain barcode related information is processed with the barcode font call-processing program so that a barcode font call can be delivered by the interpreter support system to the interpreter.

Bar code symbols are typically printed directly on an object or on labels attached to the object. The bar code symbols are read by optical techniques, such as scanning laser beams or CCD cameras, and the resulting electrical signals are decoded into data representative of the symbol for further processing. Bar code reading systems are known as "open" systems in that the carrier while being read is not sealed, but is read from a distance and without being in physical contact with the scanner.

The conventional bar code described above is "one-dimensional" in that the information encoded therein is represented by the width of the bars and spaces, which extend in a single dimension. Thus, a bar code of a supermarket item, for example, consists of a string of eleven digits, which represent an identifying number, but not a description of the item. The remainder of the relevant information, such as the price, name of the product, manufacturer, weight, inventory data, and expiration date, must be obtained from a database using the identification number.

An early disclosure of barcode symbology was disclosed in U.S. Pat. No. 1,985,035 to Kermode, and that disclosure was expanded shortly thereafter in U.S. Pat. No. 2,020,925 to Young. These early symbologies were printed by generating a multiplicity of single width elements of lower reflectance, or "bars," which were separated by elements of higher reflectance, or "spaces." An "element" is a bar or space. These early symbologies, and many "bar code symbologies" used today can be referred to as "linear symbologies" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. "Data characters" include not only human readable characters, but also include special function characters such as start, stop or shift characters that provide certain functional data. Each unique group or pattern of bars and spaces within a predetermined width defines a particular symbol character, and thus a particular data character or characters.

The known U.P.C. symbology can be described generically as a (7, 2) "n, k code." An "n,k code" is defined as a symbology where each symbol character has "k" number of bars and spaces and whose total length is "n" modules long. Therefore, the U.P.C. symbology encodes two bars and two spaces in each symbol character and each symbol character is seven modules long. A "module" is the narrowest nominal width unit of measure in a bar code symbology (a one-wide bar or space). "Nominal" refers to the intended value of a specific parameter, regardless of printing errors, etc. Under common counting techniques, the number of possible symbol characters can be found by realizing that in seven modules, there are six locations where a transition can occur, and that for two bars and two spaces, there are three internal transitions. Therefore, the number of unique symbol characters for the U.P.C. symbology is simply 6 choose 3 which equals 20. Similarly, under the Code 128 symbology, which is an (11, 3) symbology, 252 unique symbol characters are available (10 choose 5).

The bar code symbologies known as U.P.C., EAN, Code 11 and Codabar are all bar code symbology standards which support only numeric data characters, and a few special characters such as "+" and "−". The U.P.C. symbology is both a bar code standard, as well as an industry standard, in that it has been adopted by industry in a standard application (consumer goods). The bar code standard Code 39 was the first alphanumeric bar code symbology standard developed. However, it was limited to 43 characters.

Code 93 is an improvement over Code 39. Code 93 is a continuous bar code symbology employing four element widths. Each Code 93 symbol has nine modules that may be either black or white (either a bar or a space). Each symbol in the Code 93 standard contains three bars and three spaces (six elements), whose total length is nine modules long. Code 93, having nine modules and three bars per symbol is thus a (9,3) symbology which has 56 possible characters (8 choose 5). For edge-to-edge decoding reasons, the Code 93 symbology standard defines only 48 unique symbols, and thus is able to define 47 characters in its character set plus a start/stop code. The 47 characters include the numeric characters 0-9, the alphabetic characters A-Z, some additional symbols and four shift codes.

The computer industry uses its own character encoding standards, namely, the American Standard Code for Information Interchange (ASCII). ASCII defines a character set containing 128 characters and symbols. Each character in ASCII is represented by a unique 7-bit code. Since Code 39 and Code 93 are limited to fewer than 50 characters, these standards are inadequate to uniquely represent each ASCII character. The four shift codes in Code 93, however, allow this standard to unambiguously represent all 128 ASCII characters. One drawback is that a series of two Code 93 symbols are required to represent a single ASCII character. Thus, bar code labels representing characters in the ASCII character set are twice as long as labels representing characters in the Code 93 character set.

New bar code symbology standards, such as Code 128, were developed to encode the complete ASCII character set, however, these standards suffer from certain shortcomings, including requiring shift codes or other preceding symbols to represent certain characters. All of these symbologies require increased processing time and overhead to process the entire ASCII character set.

The computer industry has grown beyond the limits of the ASCII character set. As the computer markets have grown, the need has also arisen to support additional languages not defined by the ASCII character set. New character sets were developed to accommodate clusters of characters in related languages. The original 7-bit ASCII character set was expanded to 8 bits thus providing an additional 128 characters or data values. This additional 128 set of data values (the "upper 128" or "extended ASCII") allowed for additional characters present in the related romance languages (i.e., French, German, Spanish, etc.) to be represented. The only linear symbologies capable of encoding 8-bit data are Code 128, and "Code 53", which are described in U.S. Pat. No. 5,619,027, entitled "Single Width Bar Code Symbology With Full Character Set Utilizing Robust Start/Stop Characters and Error Detection Scheme."

There are various known ways of printing a bar code with a conventional laser or thermal inkjet printer. In one example, barcode bitmaps are stored in the memory of a font server or on a memory card. As understood by the present inventors, a number of vendors, such as S.A.X. Software GmbH, sell dedicated barcode font servers that replace barcode identifiers in a job with barcode bitmaps. It is further understand that Hewlett-Packard Corp. markets a memory card, or DIMM that serves a function similar to that of the dedicated barcode server. While dedicated barcode font servers or memory cards can be very effective for their intended purpose, they can be undesirable in terms of cost and flexibility. For instance, bitmap storage can be very memory intensive and the use of a memory card can lead to a significant incremental cost for one or more printers. More particularly, since the memory card is sold on a machine-by-machine basis, the owner of a fleet of network printing devices can end up incurring considerable cost for many cards.

Xerox is believed to be selling a solution in which a PostScript® interpreter is provided with a dedicated macro for binding barcode fonts. In practice, barcode font related information is embedded in a PostScript® job and the macro generates a font call for each barcode contemplated by the job. This Xerox approach is well suited for its intended purpose; however, since the approach is to be used exclusively in a PostScript® environment, it cannot be used with non-PostScript® interpreters. Moreover, difficulty can be encountered in using non-PostScript® fonts. Finally, programming flexibility is hampered by the fact that the macro runs on an interpreter platform, as opposed to an operating system platform. It would be desirable to provide a barcode font binding arrangement that is well suited for use with multiple interpreter and barcode font types In accordance with one aspect of the disclosed embodiments, there is provided a barcode printing system. The barcode printing system includes an interpreter with an interpreter program. The interpreter converts each one of multiple print jobs from a job language format to a printable format for consumption by a printer. At least one of the multiple print jobs includes an identifier indicating that the at least one of the multiple print jobs includes barcode printing related information. The barcode printing system further includes a barcode font call-processing program, with the barcode font call processing program being separate from the interpreter program. An interpreter support system is communicatively coupled with the interpreter and also communicates with the barcode font call-processing program. Each one of the multiple print jobs is read by the interpreter support system and, when the interpreter support system reads the at least one of the multiple print jobs, the at least one of the multiple print jobs is processed with said barcode font call processing program so that a barcode font call, for delivery by the interpreter support system to the interpreter, is generated by the barcode font call processing program.

In accordance with another aspect of the disclosed embodiments, there is provided a barcode font call processing system adapted for use with a printing system including an interpreter with an interpreter program. The interpreter converts each one of multiple print jobs from a job language format to a printable format for consumption by a printer. At least one of the multiple print jobs includes an identifier indicating that the at least one of the multiple print jobs includes bar code printing related information. The barcode font call processing system includes a barcode font call-processing program, with the barcode font call processing program being separate from the interpreter program. An interpreter support system is communicatively coupled with the interpreter and also communicates with the barcode font call-processing program. Each one of the multiple print jobs is read by the interpreter support system and, when the interpreter support system reads the at least one of the multiple print jobs, the at least one of the multiple print jobs is processed with said barcode font call processing program so that a barcode font call, for delivery by the interpreter support system to the interpreter, is generated by the barcode font call processing program.

In accordance with yet another aspect of the disclosed embodiments, there is provided a method for use with a printing system including an interpreter with an interpreter program. The interpreter converts each one of a first print job and a second print job from a job language format to a printable format for consumption by a marking engine. The method includes (a) interpreting the first print job with the interpreter, (b) providing a barcode font call processing program, said barcode font call processing program being separate from the interpreter program, identifying the second print job as a barcode job, and (c) processing the second print job with the barcode font call processing program to generate a barcode font call.

DESCRIPTION OF THE DISCLOSED EMBODIMENTS

Figure 1:
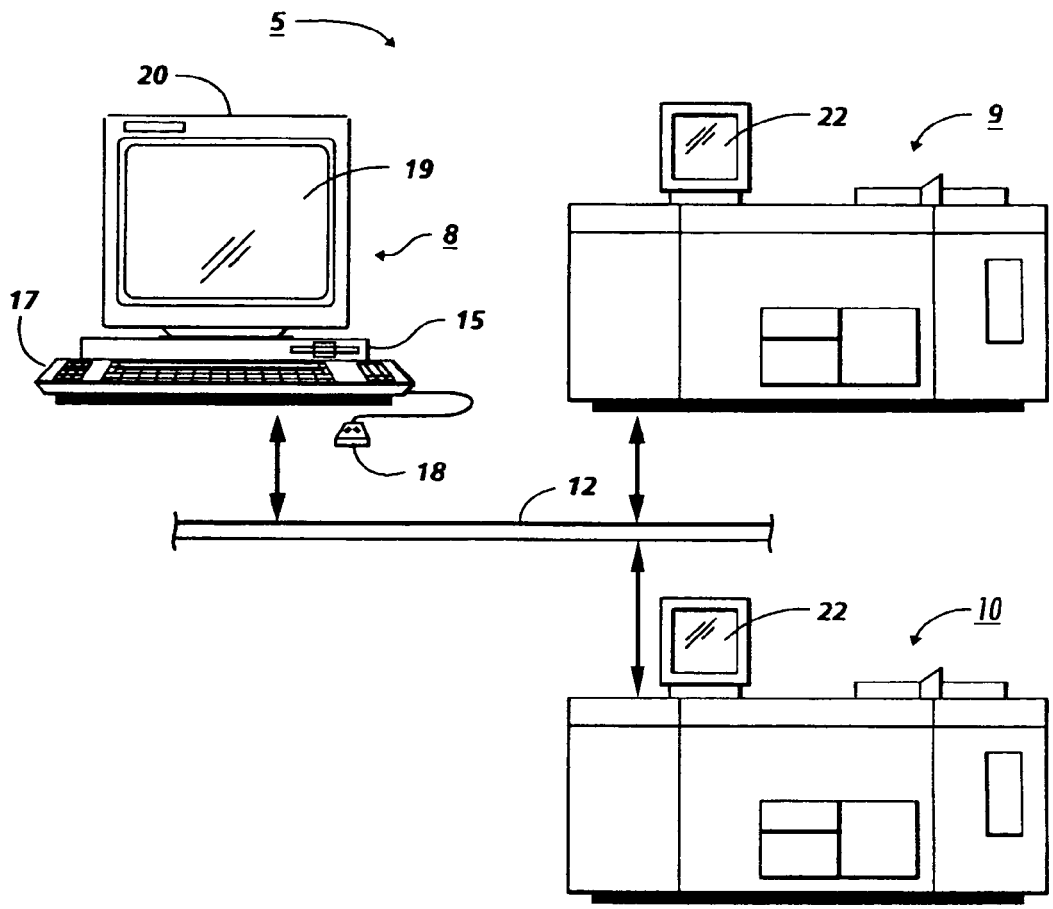
FIG. 1 is a partially schematic/partially perspective view of an electronic document processing system.

With reference now to the drawings where the showings are for the purpose of illustrating a preferred embodiment of the invention and not for limiting same, FIG. 1 shows electronic document processing system 5 including a computer workstation 8 and printing systems 9, 10 that are connected with a suitable communication channel such as EtherNet® connection 12. The connection 12 enables image data from one or more remote sources such as workstation 8, to be input to one or both of the printing systems 9, 10 for hardcopy rendering. The workstation 8 includes a computer system 15 for processing user inputs received from keyboard 17 and pointing device or mouse 18, through user interface 19 displayed on color monitor 20. The user interface 19 collectively represents user inputs through which control instructions are used to develop electronic images. Each one of the printing systems 9, 10 which has its own user interface 22 for monitoring print job requests, is adapted to print hardcopy image rendering of selected electronic images developed on workstation 8.

Figure 2:
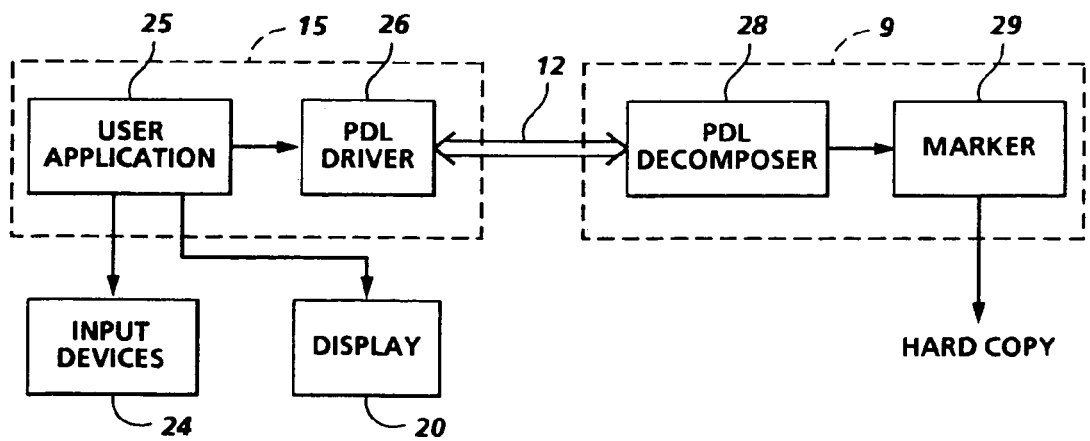
FIG. 2 is a block diagrammatic view of a print job development and decomposition system particularly suited for use in the electronic document processing system of FIG. 1.

FIG. 2 shows a block diagram representing many of the basic elements of the electronic processing system 5 shown in FIG. 1. While the decomposing and marking elements of printing system 10 are not shown in FIG. 2, such elements are substantially equivalent to those of printing system 9. In particular, the computer system 15 of workstation 8 executes a conventional graphical user application 25 such as "Windows®" developed by Microsoft Corporation. User application 25 provides a high level, device independent graphics software environment for creating, editing and viewing high quality electronic images using two dimensional image elements. Examples of image elements are text in various fonts, lines and curves of various thicknesses, strokes or enclosed outlines and sampled images, all of which can be depicted using various colors that are represented by color reference models as disclosed the Xerox Color Encoding Standard. Image elements are typically a high level description of pixels (picture elements), and unlike pixels, image elements are inherently device independent and are therefore readily transferable between various input and output devices. Additionally, the user application 25 can scale, rotate, translate and clip image elements by specifying an image transformation along with an element. The device independent specification of electronic images by application 25 enables electronic images specified in this manner to be rendered on a variety of output devices such as color printing system 9.

More specifically, image elements forming an input image emitted from PDL driver 26 are defined using high level primitives of a suitable page description language (PDL). Examples of PDLs include PostScript® ("PS") which is described in "PostScript® Language Reference Manual", Second Edition, Addison-Wesley Publishing Co., 1990, and Hewlett Packard Printer Control Language ("HP-PCL") which is described in "PCL 5 Printer Language Technical Reference Manual", First Edition, Hewlett Packard Co., 1990. In general, a PDL provides a set of commands that are used to describe various graphic and textual elements forming an image to be printed. For example, a PDL can describe a rectangle in an image by indicating coordinates of its corners, the thickness of its edges, its fill pattern, its color as well as other attributes. The PDL can also be used to include in the input image a raster image or a reference to one or more raster images. The high level primitives describing the input image form a PDL stream of data that is rendered to lower level primitives such as pixels. Each pixel corresponds to a spot that is subsequently marked using an image output terminal such as printing system 9 to form a reproduction of the input image.

Selected input images, which are stored in the memory (not shown) of workstation 8 and described using a PDL by user application 25, are transmitted to printing system 9 using print driver 26. Print driver 26 transfers PDL descriptions of electronic document files selected for printing with printing system 9. Once received and stored in the memory (not shown) of printing system 9, PDL descriptions of electronic documents are processed by PDL decomposer 28. The decomposer 28 produces corresponding color byte mapped image files of PDL descriptions of electronic documents that are subsequently rendered on paper or the like by marker 29. A functional implementation of the PDL decomposer 28, is described in detail in U.S. Pat. No. 5,493,634 to Bonk et al., the pertinent portions of which are incorporated herein by reference. The decomposer 28 executes a PDL stream to generate lower level imaging primitives, and in doing this, the decomposer further parses the PDL stream into various image related components that are further processed by decomposer 28 before output to marker 29. The types of operations required to generate image related components include, among others, binding font calls to bitmap or contour fonts, image processing on pictorial information (such as rotating, enlarging and reducing), and/or converting line art/graphics to lower level primitives.

Figure 3:
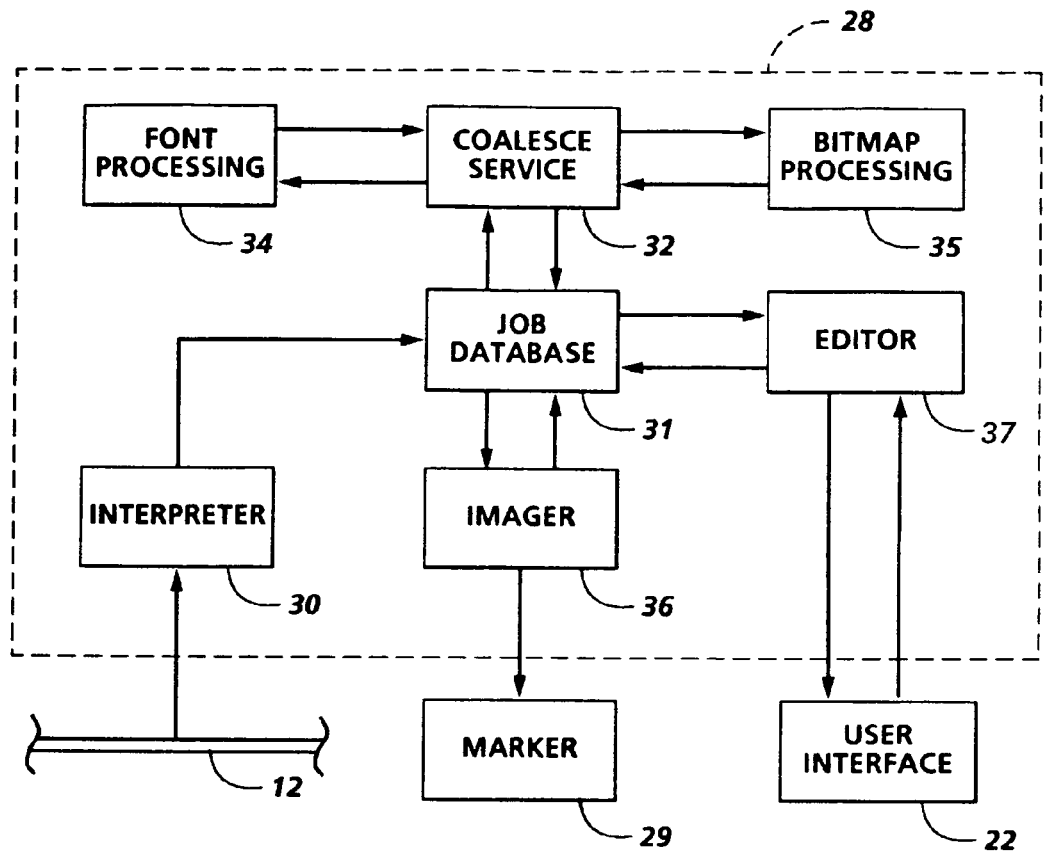
FIG. 3 is a schematic, block diagrammatic view showing further detail of the print job development and decomposition system of FIG. 2.

FIG. 3 shows a block diagram representing the major components of PDL decomposer 28. Briefly, decomposition is initiated when a PDL stream of image data is communicated through network connection 12 to the interpreter 30 of decomposer 28 after various elements of printing system 8 are appropriately coordinated. Interpreter 30 then parses the PDL stream into various image related components that are subsequently stored in the job database 31 and later referenced using identifiers. The identifiers of job components are passed from the interpreter 30 to the coalesce service 32 for font processing 34 and bitmap processing 35. Coalesced information is then imaged by imager 36 to bits that are transmitted to marker 29 to be rendered on paper. Additionally, coalesced information in database 31 can be edited using editor 37 through user interface 22 prior to transmission to marker 29.

Figure 4:
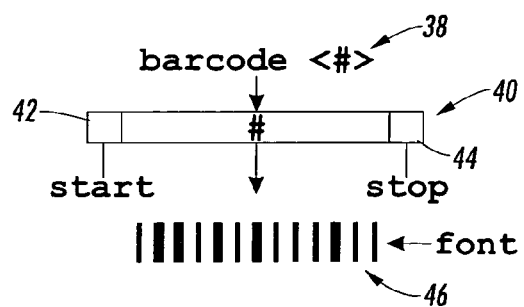
FIG. 4 is a schematic view demonstrating the formation and use of a barcode font call.

Referring to FIG. 4, an approach for binding a barcode font call with a barcode font is introduced. More particularly, a number (referred to as "#") is shown as being embedded in an argument for a page job language (PJL) command 38, namely "barcode < >." Pursuant to generating a barcode font call 40, the number (#) is combined with a start command 42 and stop command 44. As should be apparent, the #, as well as the start/stop commands are expressed in binary form. As a job is prepared for consumption by a marking engine, the barcode font call is used to retrieve the barcode font 46. As will be discussed below, the combination of the # with the start and stop components is facilitated by an Intelligent Barcode Solution (IBS) 48 (FIG. 5).

Figure 5:
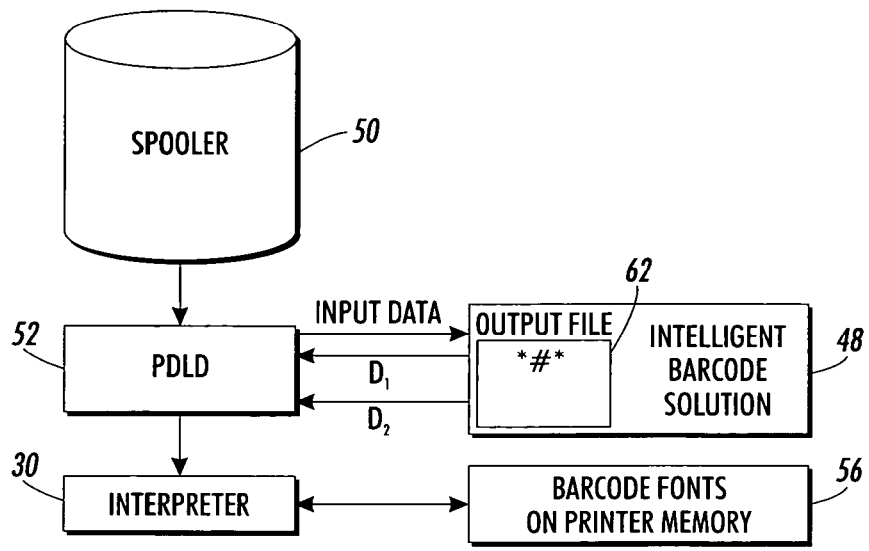
FIG. 5 is a schematic, block diagrammatic view showing further detail associated with a decomposing subsystem shown in FIG. 3.

Referring now to FIG. 5, the interpreter 30 of FIG. 3 is shown in combination with a spooler 50, a page description language daemon (PDLD) 52, the IBS 48, and barcode font storage 56. In one exemplary form of operation, a job is transmitted from the spooler 50 to the PDLD 52, and the corresponding PJL is scanned. Upon encountering an input file 58 (FIG. 6), The PDLD 52 transmits the input data of the input file to the IBS 48.

Figure 6:
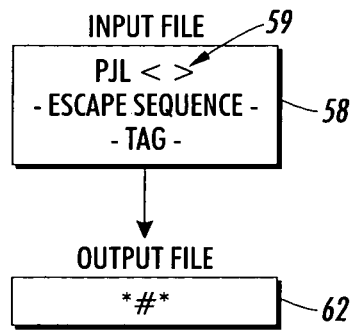
FIG. 6 is a schematic view illustrating how, through use of a disclosed embodiment, an input file (including barcode font related information) is transformed into a barcode font call.

As shown in FIG. 6, the input file 58 includes at least three pieces of information, namely an identifier 59 ("PJL < >"), an escape sequence and a tag. The identifier 59 serves to apprise the PDLD 52 of the presence of a job that should be sent to the IBS 48. As the job is transmitted from the PDLD to the IBS, barcode font related information, including the # mentioned above, is obtained. In the meantime, the tag provides information about the type of barcode to be requested with the barcode font call. While the software of input file 58, which would typically include PostScript® or PCL commands/instructions, is not disclosed in detail herein, it will be appreciated by those skilled in the art of document management related software that such commands/instructions could be readily written by reference to publicly available PostScript® or PCL manuals. Moreover, it can be appreciated that the substance underlying the subject commands/instructions would be dictated or constrained by the driver employed at a given client end.

By reference to the escape sequence and tag, the IBS 48 forms an output file 62 (FIGS. 5 and 6), placing the start command 42 and stop command 44 around barcode font related information. In the example of FIG. 6, the # is placed between two asterisks to form a barcode font call. Pursuant to generating the barcode font call, the tag is stripped from the input file. It should be appreciated that the input file 58 can include additional information useful in generating the barcode font call 40 (FIG. 4), such as (1) calculation of check digit and its placement, (2) placement of start/stop and middle bar characters, and (3) encoding and compression. With this additional information, further refinements, such as error correction, can be provided to the barcode font call.

When the input data is transmitted from the PDLD 52 to the IBS 48 in a sequence of blocks, the disclosed embodiment of FIG. 5 contemplates an advantageous approach for ensuring that a complete barcode font call is delivered to the interpreter 30 (via the PDLD 52) even when the corresponding input data for the call gets split up. More particularly, FIG. 5 shows two data lines, D1 and D2, coupling the IBS 48 and the PDLD 52. In practice, all of the data transmitted across D1 is transmitted from the PDLD 52 to the interpreter 30, and all data on D2 is appended to the front of the next block of data delivered to PDLD 52. As will appear immediately below, this appending allows for a complete barcode font call to be delivered from the PDLD to the interpreter.

Figure 7:
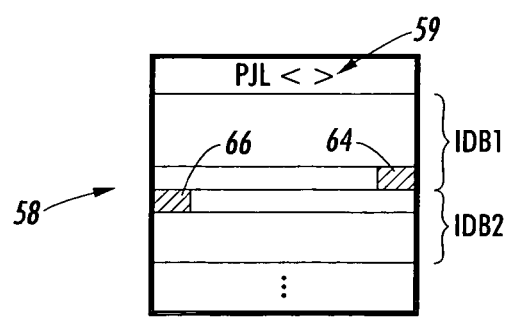
FIG. 7 is a schematic view of a print job spread over multiple blocks and including barcode font related information split among two of the multiple blocks.

Referring to FIG. 7, an example showing how D1 and D2 are used in operation is provided. In the example, the input file 58, with the identifier 59, includes input data block 1 (IDB1), IDB2, and so on. For the given example, each IDB(i) includes 100 lines of data, while a first part of a set of barcode font call related information (designated with the numeral 64) is on line 100 of IDB1 and a second part of the same set (designated with the numeral 66) is on line 1 of IDB2. As contemplated, the first 100 lines of data (with first part 64) are transmitted over D1 (for transmission by the PDLD 52 to the interpreter 30) and the barcode font call related information from line 100 is transmitted over D2 for concatenation to the beginning of IDB2 by IPLD 52 so that, when the 100 lines of IDB2 are delivered to the IBS 48, the parts 64 and 66 are "seen" by IBS 48 as a single unit. It should be appreciated that while the above technique of input data delivery contemplates a block-by-block approach, the input data could be streamed from PDLD 52 to IBS 48 without affecting the concept of operation.

Various advantages flow from the above-described approach: First, the IBS 48 is a printer based barcode shared library object developed in native controller code and can be installed or updated with a downloadable DLM object. Thus (a) the IBS 48 can work with a significant range of barcode fonts, including PCL fonts, because the IBS 48 is software that operates independently of any particular PDL/PJL, (b) a customer can have a vendor customize a barcode font design (independent of interpreter type), and easily use that design with the IBS 48, and (c) there is, in cases where sufficient memory resides on the printer, no need for additional external/internal hardware.

Second, because IBS 48 is a software solution, it can be used commonly across a fleet of network printers in a network, even when those printers have different significantly different features. For instance, the IBS 48 can accommodate different interpreters, as well as barcode fonts, because there is no need to maintain special hardware and/or software of the type that has previously been required for many conventional barcode printers. This network-wide flexibility could come at a very competitive low cost to a customer with a fleet of network printers since that customer could operate the IBS 48 with an enterprise-wide software license, as opposed to investing in special hardware on a machine-by-machine basis.

Finally, because of the way that the IBS 48 is conceived, there is a great deal of flexibility in usage. In particular, the IBS runs on an operating system platform instead of an interpreter platform. The separateness of the IBS 48, with respect to the interpreter 30, provides a very high level of design flexibility. For instance, a customized font can be loaded on a printer and only relatively simple programming changes to the input data file 58 are needed to deliver suitable barcode font call related information to the IBS 48. Moreover, adjustments in barcode density can be achieved by reprogramming the escape sequence at the client driver rather than at the interpreter. This sort of programming is believed to be significantly easier than it would be at the printer.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A barcode printing system, comprising:
   an interpreter with an interpreter program, said interpreter converting each one of multiple print jobs from a job language format to a printable format for consumption by a printer, wherein at least one of the multiple print jobs includes an identifier indicating that the at least one of the multiple print jobs includes barcode printing related information;
   a barcode font call processing program, said barcode font call processing program being separate from the interpreter program; an interpreter support system, communicatively coupled with the interpreter and communicating with said barcode font call processing program, for reading each one of the multiple print jobs; and
   wherein, when said interpreter support system reads the at least one of the multiple print jobs, the at least one of the multiple print jobs is processed with said barcode font call processing program so that a barcode font call, for delivery by said interpreter support system to said interpreter, is generated by said barcode font call processing program.

2. The printing system of claim 1, wherein the bar code printing related information is contained in an input file, and wherein said input file is processed with said barcode font call processing program to form an output file when said interpreter support system reads the at least one of the multiple print jobs.

3. A barcode font call processing system adapted for use in a printing system including an interpreter with an interpreter program, the interpreter converting each one of multiple print jobs from a job language format to a printable format for consumption by a printer, wherein at least one of the multiple print jobs includes an identifier indicating that the at least one of the multiple print jobs includes barcode printing related information, a barcode font call processing system, said barcode font call processing system comprising:
   a barcode font call processing program, said barcode font call processing program being separate from the interpreter program;
   an interpreter support system, communicatively coupled with the interpreter and communicating with said barcode font call processing program, for reading each one of the multiple print jobs; and
   wherein, when said interpreter support system reads the at least one of the multiple print jobs, the at least one of the multiple print jobs is processed with said barcode font call processing program so that a barcode font call, for delivery by said interpreter support system to the interpreter, is generated by said barcode font call processing program.

4. The barcode font call processing system of claim 3, wherein the bar code printing related information is contained in an input file, and wherein said input file is processed with said barcode font call processing program to form an output file when said interpreter support system reads the at least one of the multiple print jobs.

5. The barcode font call processing system of claim 4, wherein said input file includes a first section and a second section, and wherein the identifier is located in said first section.

6. The barcode font call processing system of claim 5, wherein at least one instruction for transforming the bar code printing related information to the barcode font call is located in said second section.

7. The barcode font call processing system of claim 4, wherein said input file includes at least one instruction for transforming the bar code printing related information to the barcode font call.

8. The barcode font call processing system of claim 7, in which said input file includes a number, wherein said at least one instruction causes said number to be combined with start and stop information.

9. The barcode font call processing system of claim 7, wherein said at least one instruction causes the barcode font call to be provided with error correction.

10. The barcode font call processing system of claim 4, in which said input file is divided into a first section and a second section, and in which a first part of the barcode printing rerated information is located in the first section and a second part of the barcode printing related information is located in the second section, wherein said barcode font call processing program and said interpreter support system function cooperatively to cause the first part of the barcode printing related information and the second part of the barcode printing related information to be generated as a single barcode font call.

11. A barcode font call processing system adapted for use in a printing system including an interpreter with an interpreter program, the interpreter converting each one of multiple print jobs from a job language format to a printable format for consumption by a printer, wherein at least one of the multiple print jobs includes an identifier indicating that the at least one of the multiple print jobs includes barcode printing related information, a barcode font call processing system, said barcode font call processing system comprising:
 a barcode font call processing program, said barcode font call processing program being separate from the interpreter program;
 an interpreter support system, communicatively coupled with the interpreter and communicating with said barcode font call processing program, for reading each one of the multiple print jobs;
 wherein, when said interpreter support system reads the at least one of the multiple print jobs, the at least one of the multiple print jobs is processed with said barcode font call processing program so that a barcode font call, for delivery by said interpreter support system to the interpreter, is generated by said barcode font call processing program;
 wherein the bar code printing related information is contained in an input file, and wherein said input file is processed with said barcode font call processing program to form an output file when said interpreter support system reads the at least one of the multiple print jobs;
 wherein said input file includes a first section and a second section, and wherein the identifier is located in said first section;
 wherein at least one instruction for transforming the bar code printing related information to the barcode font call is located in said second section; and
 wherein the at least one instruction is removed from the input file pursuant to transforming the bar code printing related information.

12. A barcode font call processing system adapted for use in a printing system including an interpreter with an interpreter program, the interpreter converting each one of multiple print jobs from a job language format to a printable format for consumption by a printer, wherein at least one of the multiple print jobs includes an identifier indicating that the at least one of the multiple print jobs includes barcode printing related information, a barcode font call processing system, said barcode font call processing system comprising:
 a barcode font call processing program, said barcode font call processing program being separate from the interpreter program;
 an interpreter support system, communicatively coupled with the interpreter and communicating with said barcode font call processing program, for reading each one of the multiple print jobs;
 wherein, when said interpreter support system reads the at least one of the multiple print jobs, the at least one of the multiple print jobs is processed with said barcode font call processing program so that a barcode font call, for delivery by said interpreter support system to the interpreter, is generated by said barcode font call processing program;
 wherein the bar code printing related information is contained in an input file, and wherein said input file is processed with said barcode font call processing program to form an output file when said interpreter support system reads the at least one of the multiple print jobs;
 wherein said input file includes at least one instruction for transforming the bar code printing related information to the barcode font call; and
 wherein the at least one instruction is removed from the input file pursuant to transforming the bar code printing related information.

13. A barcode font call processing system adapted for use in a printing system including an interpreter with an interpreter program, the interpreter converting each one of multiple print jobs from a job language format to a printable format for consumption by a printer, wherein at least one of the multiple print jobs includes an identifier indicating that the at least one of the multiple print jobs includes barcode printing related information, a barcode font call processing system, said barcode font call processing system comprising:
 a barcode font call processing program, said barcode font call processing program being separate from the interpreter program;
 an interpreter support system, communicatively coupled with the interpreter and communicating with said barcode font call processing program, for reading each one of the multiple print jobs;
 wherein, when said interpreter support system reads the at least one of the multiple print jobs, the at least one of the multiple print jobs is processed with said barcode font call processing program so that a barcode font call, for delivery by said interpreter support system to the interpreter, is generated by said barcode font call processing program; and
 a second interpreter with a second interpreter program, wherein said barcode font call processing program is separate from the first and second interpreter programs, and wherein said barcode font call processing program is adapted to deliver the barcode font call to a selected one of the interpreter and the second interpreter.

14. The barcode font call processing system of claim 13, in which the printing system includes a first printer communicatively coupled with a second printer by way of a network, wherein the interpreter is contained in the first printer and the second interpreter is contained in the second printer.

15. A method for use with a printing system including an interpreter with an interpreter program, the interpreter converting each one of a first print job and a second print job from a job language format to a printable format for consumption by a marking engine, comprising:
providing a barcode font call-processing program, said barcode font call processing program being separate from the interpreter program;
interpreting the first print job with the interpreter, wherein the first print job is interpreted without using the barcode font call-processing program;
identifying the second print job as a barcode related job; and
in response to said identifying, processing the second print job with the barcode font call processing program to generate a barcode font call.

16. The method of claim 15, in which the second print lob is included in an input file, wherein said identifying includes reading an identifier embedded in the input file.

17. The method of claim 15, in which the second print job is included in an input file and includes barcode font call related information, and in which the input file includes an instruction, wherein said processing includes processing the barcode font call related information with the instruction to obtain the barcode font call.

18. The method of claim 17, in which the input file includes a number, wherein said processing includes adding start and stop information to the number.

19. A method for use with a printing system including an interpreter with an interpreter program, the interpreter converting each one of a first print job and a second print job from a job language format to a printable format for consumption by a marking engine, comprising:
providing a barcode font call-processing program, said barcode font call processing program being separate from the interpreter program;
interpreting the first print job with the interpreter, wherein the first print job is interpreted without using the barcode font call-processing program;
identifying the second print job as a barcode related job;
in response to said identifying, processing the second print job with the barcode font call processing program to generate a barcode font call;
in which the second print job is included in an input file and includes barcode font call related information, and in which the input file includes an instruction, wherein said processing includes processing the barcode font call related information with the instruction to obtain the barcode font call; and
removing the instruction from the input file after processing the barcode font call related information.

20. A method for use with a printing system including an interpreter with an interpreter program, the interpreter converting each one of a first print job and a second print job from a job language format to a printable format for consumption by a marking engine, comprising:
providing a barcode font call-processing program, said barcode font call processing program being separate from the interpreter program;
interpreting the first print job with the interpreter, wherein the first print job is interpreted without using the barcode font call-processing program;
identifying the second print job as a barcode related job;
in response to said identifying, processing the second print job with the barcode font call processing program to generate a barcode font call; and
in which the printing system includes a second interpreter, further comprising transmitting the barcode font call to a selected one of the interpreter and the second interpreter.

* * * * *